(12) United States Patent
Hove et al.

(10) Patent No.: US 6,396,002 B1
(45) Date of Patent: May 28, 2002

(54) METHOD OF AND APPARATUS FOR MONITORING THE CONTENTS OF CONTAINERS

(75) Inventors: Wilke van Hove, Hamburg; Manfred Gebauer, Lübeck, both of (DE)

(73) Assignee: Topack Verpackungstechnik GmbH, Schwarzenbek (DE)

(*) Notice: Subject to any disclaimer, the term of this patent is extended or adjusted under 35 U.S.C. 154(b) by 15 days.

(21) Appl. No.: 09/641,761

(22) Filed: Aug. 21, 2000

(30) Foreign Application Priority Data

Aug. 20, 1999 (DE) .......................... 199 39 669

(51) Int. Cl.[7] .................... G01G 19/52; B65B 1/30
(52) U.S. Cl. ........................... 177/50; 141/83
(58) Field of Search .................. 141/83; 177/50, 177/119, 145

(56) References Cited

U.S. PATENT DOCUMENTS

| 3,626,953 A |   | 12/1971 | Körber et al. ............... 131/22 |
| 3,991,605 A |   | 11/1976 | Reuland ....................... 73/38 |
| 4,122,940 A | * | 10/1978 | Hoffman ...................... 177/50 |
| 4,170,251 A | * | 10/1979 | Hine, II ....................... 141/83 |
| 4,238,027 A | * | 12/1980 | Oelte .......................... 177/50 |
| 4,344,493 A | * | 8/1982  | Salmonsen et al. .......... 177/145 |
| 4,437,561 A | * | 3/1984  | Hasegawa et al. ........... 177/145 |
| 4,972,494 A |   | 11/1990 | White et al. ................... 382/8 |
| 5,072,797 A | * | 12/1991 | Hughes ....................... 177/145 |
| 5,331,118 A |   | 7/1994  | Jensen ..................... 177/25.14 |
| 5,560,515 A |   | 10/1996 | Dyett et al. ................. 221/135 |
| 5,576,520 A | * | 11/1996 | Waterman et al. .......... 177/145 |
| 5,736,682 A |   | 4/1998  | Heitmann et al. ............ 177/16 |
| 5,929,387 A | * | 7/1999  | Inglin ......................... 177/119 |
| 6,252,181 B1| * | 6/2001  | Fallas et al. ................ 177/119 |

FOREIGN PATENT DOCUMENTS

EP          0 816 234          1/1998

* cited by examiner

Primary Examiner—Randy W. Gibson
(74) Attorney, Agent, or Firm—Venable; Robert Kinberg

(57) ABSTRACT

The integrity of the contents of containers (such as cartons containing arrays of cigarette packets) is ascertained in an apparatus wherein a continuously or intermittently operated conveyor advances successive containers of a series of such containers onto and beyond a weighing device (such as a strain gage) which transmits signals denoting the weights of successive containers to a circuit wherein such signals are compared with a reference signal denoting the weight of a container having satisfactory contents. If the difference between the weight of a freshly weighed container and a desired or required weight exceeds a preselected value, the respective container is expelled from the path for acceptable containers. The reference signal can be updated upon completed weighing of each acceptable container.

7 Claims, 3 Drawing Sheets

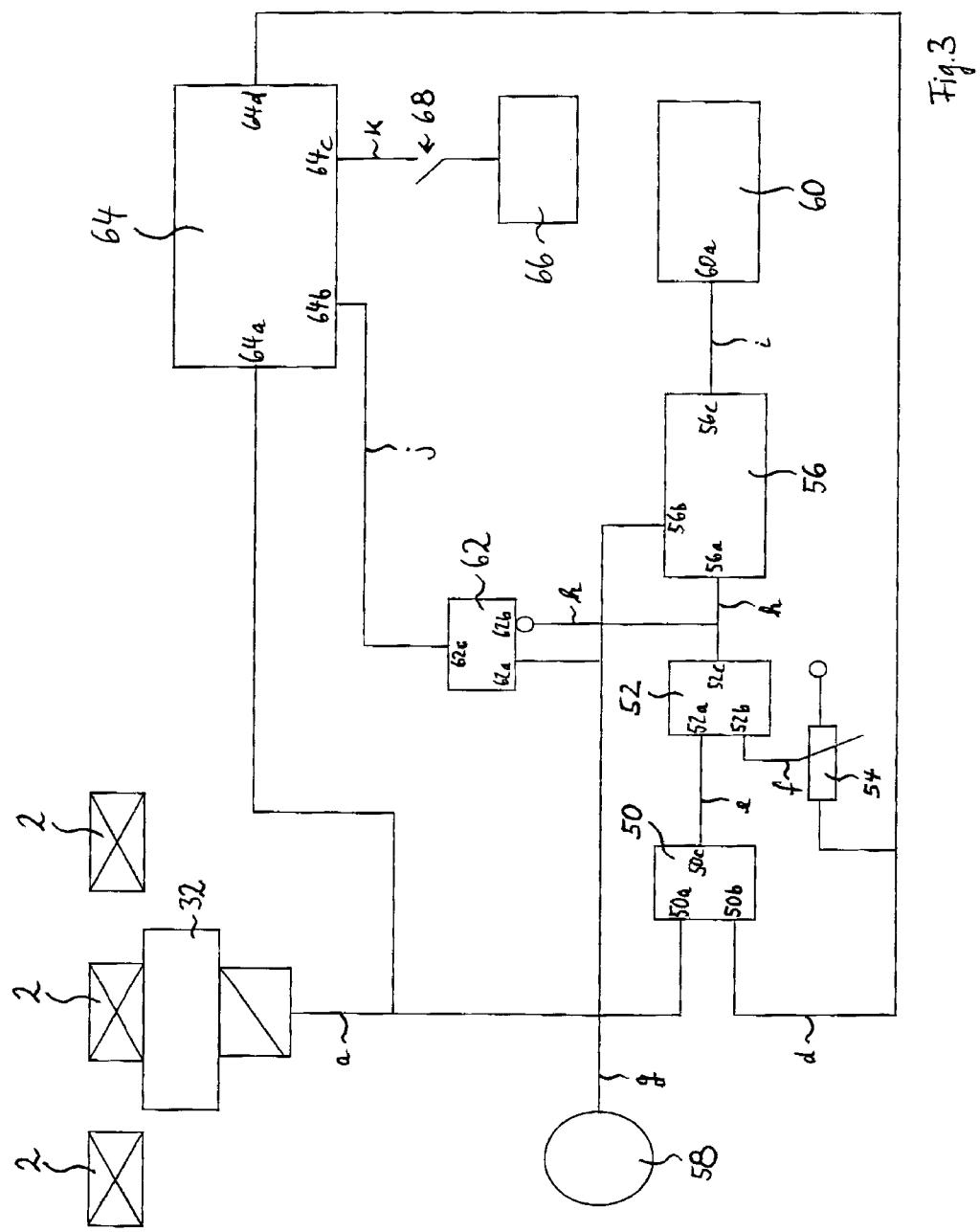

METHOD OF AND APPARATUS FOR MONITORING THE CONTENTS OF CONTAINERS

CROSS-REFERENCE TO RELATED CASES

This application claims the priority of commonly owned German patent application Serial No. 199 39 669.8 filed Aug. 20, 1999. The disclosure of the above-referenced German patent application, as well as that of each U.S. and/or foreign patent and patent application identified in the specification of the present application, is incorporated herein by reference.

BACKGROUND OF THE INVENTION

The invention relates to improvements in methods of and in apparatus for monitoring the contents of containers, and more particularly to improvements in methods of and in apparatus for ascertaining the presence and/or absence of integrity of the contents of containers.

It is often necessary to monitor containers which conceal their contents so that a optical inspection of such contents is not possible or unreliable or too expensive. Examples of such container are so-called cartons which are or which can be made of or contain cardboard and confine arrays of rod-shaped smokers' products, e.g., arrays of ten packets of plain of filter cigarettes or other rod-shaped smokable products. The absence of one or more packets cannot be detected with the naked eye until or unless the carton is opened by the purchaser or in a store which sells entire cartons as well as discrete packets of such commodities, Therefore, there exists and urgent need to reliably ascertain the integrity or the absence of integrity of the contents of such cartons or numerous other types of containers wherein the contents are concealed prior to opening. An optimal mode of carrying out a monitoring of the contents of cigarette cartons and analogous containers (e.g., boxes containing predetermined numbers of cartons) is before the containers leave the manufacturing plant. In a cigarette making plant, the monitoring operation should be carried out before a carton with fewer than the required number (such as ten) of cigarette packets therein is confined in a box jointly with a substantial number of satisfactory cartons.

OBJECTS OF THE INVENTION

An object of the invention is to provide a novel and improved method of reliably ascertaining the integrity or absence of integrity of the contents of containers, particularly at a rate at which the containers are filled and sealed in a mass-producing plant.

Another object of the invention is to provide a method which can be resorted to even if the contents of a finished container are fully concealed from view by the material which constitutes or forms part of a container.

A further object of the invention is to provide a method which can be resorted to under circumstances when successive containers of a series of such containers are turned out at a rate which is customary in a mass-producing cigarette making or an analogous tobacco processing plant.

An additional object of the invention is to provide a novel and improved apparatus for the practice of the above outlined method.

Still another object of the invention is to provide the apparatus with novel and improved means for updating the information which is required in connection with the carrying out of the above outlined method.

A further object of the invention is to provide an apparatus which can be incorporated in a maker of plain or filter cigarettes or other smokers' products wherein packets of such products are confined in containers of a first type and arrays of containers of such first type are or can be confined in containers of a second type.

Another object of the invention is to provide a novel and improved container conveying system for use in the above outlined apparatus.

An additional object of the invention is to provide a novel and improved signal processing arrangement for use in, or in conjunction with, an apparatus of the above outlined character.

Still another object of the invention is to provide a production line which employs one or more apparatus of the above outlined character.

SUMMARY OF THE INVENTION

One feature of the present invention resides in the provision of a method of ascertaining the presence and absence of integrity of the contents of containers of the type having a predetermined weight when the integrity of the contents is within a preselected acceptable range. The contents of the containers can include smokers' products; for example, the containers can constitute so-called cartons and their contents can consist of arrays of packets of cigarettes or other rod-shaped smokers' products. Alternatively, the containers can constitute boxes and their contents can constitute arrays of cartons containing packets of cigarettes or the like.

The improved method comprises the steps of individually weighing the containers, and comparing the thus ascertained weights with the predetermined weight.

The method can further comprise the step of intermittently advancing a series of successive containers along a predetermined path (e.g., a straight horizontal path) including a weighing station. The weighing step of such method includes weighing successive containers of the series while at a standstill at the weighing station.

Alternatively, the method can further comprise the step of advancing a series of successive containers along a predetermined path, and the weighing step can include weighing successive containers of the series in a predetermined portion of the path. The comparing step of such method can comprise averaging the ascertained weights of a plurality of containers and utilizing the averaged weights as the predetermined weight. Such method can further comprise the step of updating the averaged weights upon completed weighing of at least some of the successive containers in the predetermined portion of the path. If the contents of the containers are pluralities of commodities (e.g., cigarette packets) and a container has a desired predetermined weight when its contents encompasses X (e.g., ten properly arrayed) commodities, the updating step can include altering (when necessary) the averaged weights upon completed weighing of each container wherein the contents encompasses between X−1 and X+1 commodities (i.e., wherein the actual number of commodities is very close to the optimum number).

The predetermined weight can be an experimentally ascertained weight; such weight can be resorted to in connection with the practice of the improved method when the testing operation is started, i.e., in the absence of available averaged weights.

It is also within the purview of the invention to advance a series of successive containers along a predetermined path including the aforementioned weighing station, and to carry out a weighing step which includes weighing successive containers of the series while the containers are in motion at the weighing station.

Another feature of the present invention resides in the provision of an apparatus which is constructed and assembled to ascertain the presence and absence of integrity of the contents of containers of the type having a predetermined weight when the integrity of the contents is within a preselected acceptable range. The improved apparatus comprises a weighing device which is arranged to monitor the weights of discrete containers and to generate first and second signals which respectively denote containers with contents having integrities within and outside of the preselected acceptable range, a source of third signals which denote the weight of a container with contents having an integrity within the preselected acceptable range, and means for comparing the third signals with signals having been generated by the weighing device upon completed weighing of successive containers.

The apparatus can further comprise means for conveying successive containers of a series of containers along a predetermined path. The weighing device is adjacent a predetermined portion of such path and is arranged to weigh successive containers of the series. The weighing device can be constructed an assembled to weigh successive containers while the containers are in motion along the predetermined portion of the path.

Alternatively, the conveying means can include means for advancing containers in a stepwise fashion and the weighing device of such apparatus is preferably arranged to weigh successive containers of the series while the container in the predetermined portion of the path (i.e., at the weighing station) is at a standstill.

The conveying means can comprise guide means (such as one or more elongated rails) defining the predetermined path, and carriages which serve to advance successive containers of the series along the predetermined path. The weighing device can be associated with (e.g., integrated into) e guide means. The guide means can define at least one stationary track, and the weighing device can include a weighing platform which is arranged to support the weight of a container in the predetermined portion of the path. Such conveying means can further comprise discrete means for pushing successive containers of the series along the predetermined path, and at least one elongated flexible element arranged to move along such path. The pushing means can be provided on the at least one flexible element, and the conveying means can further comprise a plurality of suitable abutments or stops which are carried by the at least one flexible element and each of which is associated with one of the pushing means in such a way that each container advancing along the predetermined path is located in front of a pushing means and behind the associated abutment.

In accordance with a presently preferred embodiment of the apparatus, the weighing device comprises at least one strain gage.

The novel features which are considered as characteristic of the invention are s forth in particular in the appended claims. The improved apparatus itself, however, both as to its construction and the modes of assembling and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 3 is a block diagram of the signal processing circuit in the apparatus of FIGS. 1 and 2.

DESCRIPTION OF PREFERRED EMBODIMENTS

Figure 1:
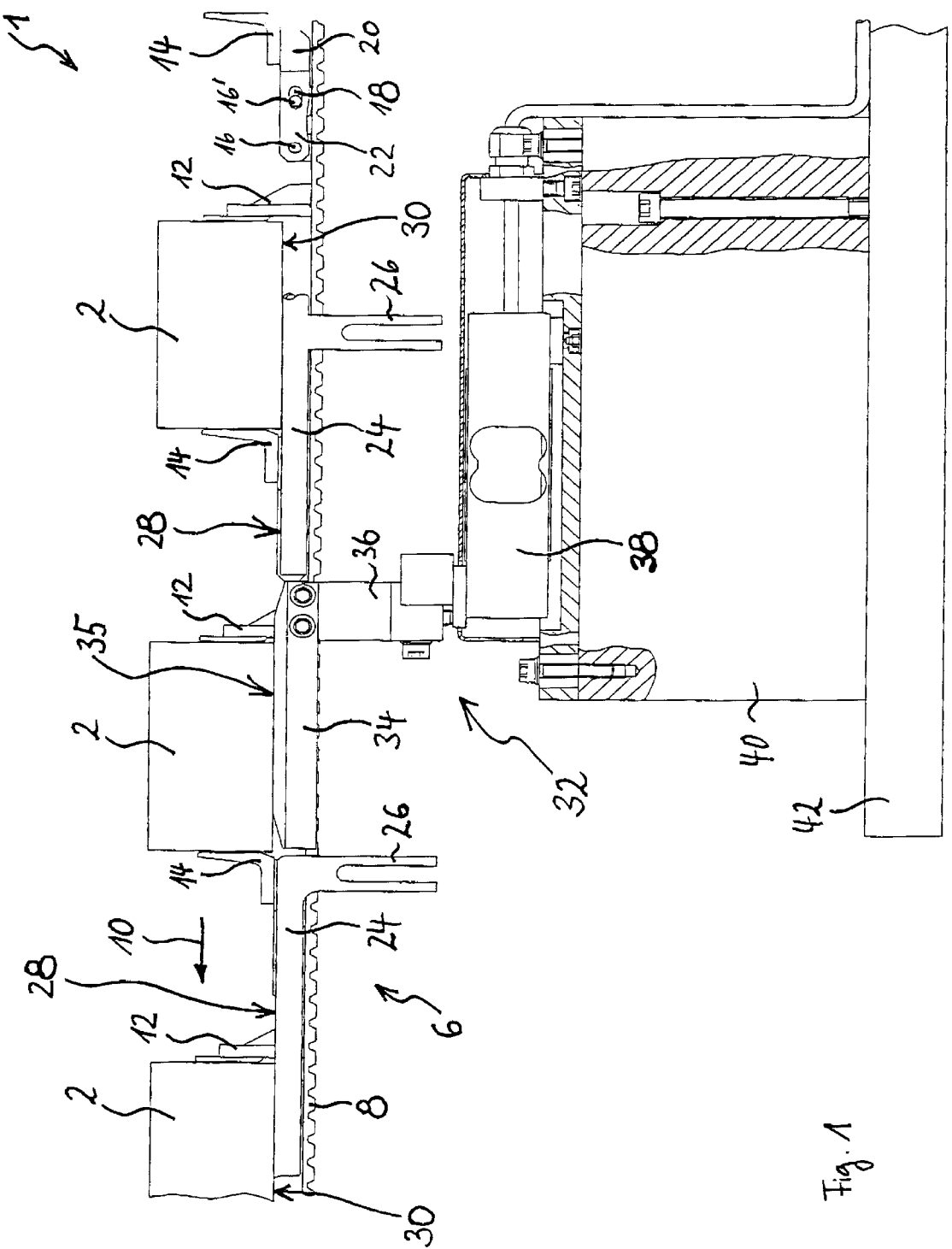
FIG. 1 is a schematic partly front elevational and partly vertical sectional view of an apparatus which embodies one form of the present invention.
Figure 2:
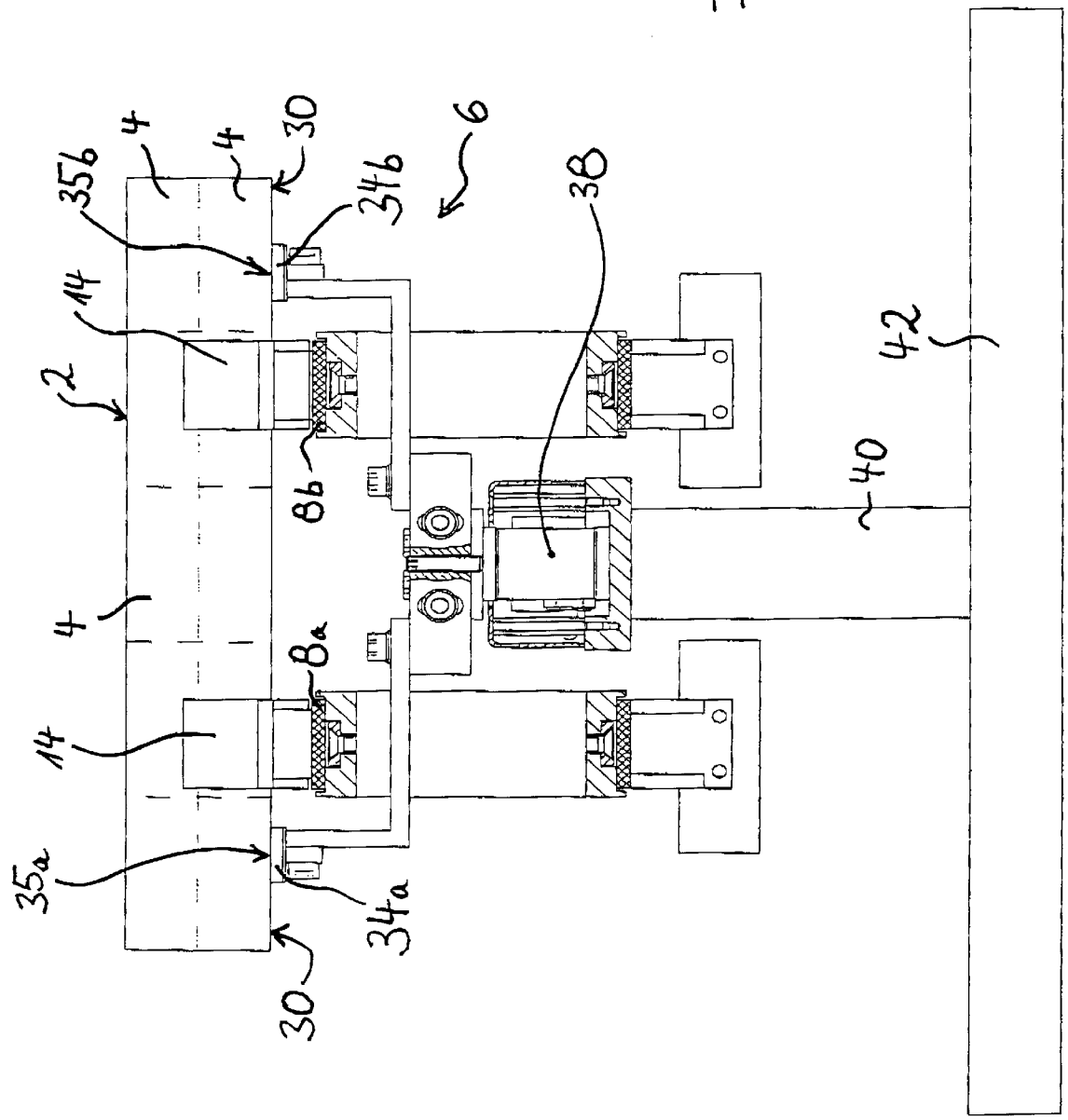
FIG. 2 is a schematic partly end elevational and partly vertical sectional view of the apparatus as seen from the left-hand side of FIG. 1.

FIGS. 1 and 2 show certain relevant parts of an apparatus 1 which is constructed and assembled to ascertain the integrity or lack of integrity of the contents of containers 2. Each of the illustrated containers 2 is a so-called carton the contents of which normally constitute an array of ten soft or hinged-lid cigarette packets 4 (shown in FIG. 2 by broken lines). Each complete array consists of two superimposed layers of five packets 4 each. However, the exact distribution of the contents of containers which can be monitored in accordance with the method and in the apparatus of the present invention is of no importance; all that counts is to ascertain whether or not the weight of the contents of successively monitored containers matches or sufficiently approximates a predetermined or preselected weight.

The apparatus 1 can be installed between a maker of cartons 2 (e.g., a maker of the type known as B 90) and a machine known as Pewo-Fold which serves to provide each carton with a transparent or translucent outer envelope. Alternatively, the apparatus 1 can be installed between a Pewo-Fold and a machine known as CP 90; the latter serves to introduce arrays of, for example, twentyfive cartons into boxes which are used to ship packets of cigarettes to storage or to consumers. The aforementioned machines and the aforementioned maker are distributed by the assignee of the present application.

The apparatus 1 comprises a conveying means 6 serving to advance a series of successive containers 2 (hereinafter called cartons for short) along a predetermined path (FIG. 1 shows a horizontal path) past a weighing station occupied by a weighing device 32. The conveying means 6 comprises a composite endless flexible element 8 including two discrete toothed belts 8a, 8b (shown in FIG. 2) which are located in two spaced-apart vertical planes and carry longitudinally spaced-apart pushing means 12 (hereinafter called pushers for short) abutting the rear sides of the adjacent cartons 2 and cooperating with abutments or stops 14 which are adjacent the front sides of the respective cartons. FIG. 2 shows that the cartons 2 extend transversely of the path defined by the conveying means 6 and that each such carton is held in contact with the respective pair of pushers (not shown in FIG. 2) by two abutments 14. Such construction of the conveying means 6 ensures that the position of a carton 2 relative to the belts 8a, 8b remains unchanged regardless of whether the prime mover (not shown) for the conveying means is operated continuously or in a stepwise fashion. The direction of intermittent or continuous advancement of successive cartons 2 toward, through and beyond the weighing station is indicated in FIG. 1 by an arrow 10.

The pushers 12 and/or the abutments 14 are preferably adjustable longitudinally of the respective belts 8a, 8b. This enhances the versatility of the apparatus 1 because the latter can be readily set up to monitor the weights of the contents of larger or smaller containers. FIG. 1 shows that the apparatus is designed to permit for adjustments of the abutments 14 relative to the respective (immediately following) pushers 12. To this end, each abutment 14 comprises a substantially plate-like bottom part 20, at least one link 22 which is affixed to the respective belt 8a or 8b by a first threaded fastener 16 and has an elongated slot 18 extending in parallelism with the direction indicated by the arrow 10, and a second threaded fastener 16' which extends through the slot 18 and separably and adjustably secures the link 22 to the bottom part 20. FIG. 1 merely shows an adjustable connection between the endless flexible element 8 and one of the abutments 14. Other types of adjustable connections can be resorted to with equal or similar advantage.

The conveying means 6 further comprises elongated guide means in the form of tracks or rails 24 having downwardly extending arms 26 adapted to be secured to a support (not shown) for the apparatus 1. The actual path for successive cartons 2 of a shorter or longer or continuous series of cartons to be weighed is defined by the upper sides or surfaces 28 of the tracks 24; such upper sides 28 are contacted by the undersides 30 of the cartons 2 each of which is disposed between a pair of pushers 12 and a pair of abutments 14. The belts 8a, 8b, the pushers 12 and the abutments 14 can be said to constitute a series of coherent carriages each of which can transport a discrete carton from a loading station (such as the outlet of the aforementioned B 90 machine), past the weighing device 32, past an ejector 60 (FIG. 3) for cartons the contents of which have a weight outside of an acceptable range of weights, and on to a further processing station (such as that accommodating the aforementioned Pewo-Fold).

The weighing device 32 is associated with and can be integrated into a component part of the conveying means 6. FIG. 1 shows that the weighing device 32 comprises a composite weighing platform 34 which is integrated into the tracks 24. A connector 36 is provided to couple the weighing platform 34 with a strain gage 38 of the weighing device 32. The strain gage 38 comprises at least one wire or another stretchable or tensionable element and is connected with a computer which processes the signals generated when a carton 2 rests on the platform 34. The computer compares the (first and second) signals furnished by the strain gage 38 of the weighing device 32 with a third signal denoting the weight of a carton when the integrity of its contents is within a preselected acceptable range. The first signals from the strain gage 38 denote the weights of cartons 2 with contents the integrities of which are within a preselected acceptable range, and the second signals from the strain gauge 38 denote the weights of with contents the integrities of which are outside of the acceptable range, e.g., because the carton contains nine (in lieu of ten) packets 4. If the weight of a carton 2 is indicative of contents the integrity of which is outside of the acceptable range, the computer transmits a signal to the ejector 60 which segregates (e.g., mechanically and/or pneumatically and/or otherwise) the respective carton from the series of cartons on or downstream of the conveying means 6. For example, the arrangement can be such that, if the weight of a carton 2 is satisfactory when the carton contains X packets, the range of acceptable weights is between X+1 and X−1. Thus, a weight which is indicative of the combined weight of more than nine packets can be considered as being acceptable as long as it does not reach a value denoting the combined weight of eleven packets 4.

In accordance with a feature of the invention, the computer can continuously or frequently update the third signal which is indicative of the weight of a carton when the integrity of its contents is within an acceptable range. This can be achieved by resorting to a third signal denoting the averaged weight of a shorter or longer series of previously weighed satisfactory cartons. All this will be described in full detail with reference to the circuitry of FIG. 3.

The weighing device 32 (inclusive of its strain gage 38) is mounted on a housing or support 40 which, in turn, is mounted on a base 42.

FIG. 3 illustrates the constituents of a computer which receives signals a from the strain gage 38 of the weighing device 32 and processes such signals in accordance with a presently preferred embodiment of the invention. FIG. 3 further shows a generator 58 of clock pulses g which are transmitted at a frequency related to the rate of advancement of successive cartons 2 to the weighing station, i.e., into that portion of the path defined by the conveying means 6 which accommodates the weighing platform 34. As shown in FIG. 2, the platform 34 can comprise two sections 34a, 34a having upper sides or surfaces 35a, 35b which are contacted by the underside 30 of the carton 2 at the weighing station. The sections 34a, 34a of the composite platform 34 flank the path for successive increments of the belts 8a, 8b through the weighing station (reference may be had again to FIG. 2).

FIG. 3 shows that the strain gage of the weighing device 32 transmits signals a to the input 50a of a differential amplifier 50. The latter comprises a second input 50b which receives signals a denoting the normally continuously updated desirable or acceptable weight of a carton 2, i.e., of a carton having contents the integrity of which is within a preselected acceptable range. The signals a are further transmitted to the input 64a of an evaluating/averaging circuit 64, and the processed signals a are utilized (when warranted) to actuate the ejector 60, i.e., to segregate the respective cartons 2 (with contents the integrity of which is outside of the preselected acceptable range) from the path of acceptable cartons to the next processing station.

The signals a can constitute voltage signals, the same as the signal d. The latter constitutes a signal denoting the averaged weight of n successively weighed satisfactory (acceptable) cartons 2. The output 50c of the differential amplifier 50 transmits a signal e which is indicative of the difference between the signal d and the signal a generated by the strain gage 38 while a carton 2 is resting on or advances along the upper sides 35a, 35b of sections 34a, 34a of the composite weighing platform 34.

The signals e are transmitted to the input 52a of a signal comparing stage 52. The latter has a second input 52b arranged to receive signals f from an adjustable potentiometer 54. The signals f are indicative of the permissible extent of departure of the intensity and/or another characteristic of a signal e from an acceptable value, i.e., the signals f determine the range of acceptable tolerances for positive or negative deviations of the characteristics of signals e from an acceptable value. Thus, the signal comparing stage 52 takes into consideration the absolute value but disregards the (positive or negative) sign of the signal f.

If the intensity of the signal e at the input 52a exceeds that of the signal f at the input 52b, the digital output 52c of the signal comparing stage 52 is set to HIGH. The output 52c then transmits a signal h to the input 56a of a shift register 56. The latter includes a second input 56b for clock pulses g being transmitted by the generator 58. When the carton 2 which has caused the weighing device 32 to transmit a "defect" signal a reaches the ejector 60, the input 60a of this ejector receives an "eject" signal i from the output 56c of the shift register 56, and the ejector is actuated to segregate the respective carton 2 from the cartons which cause the weighing device 32 to transmit signals a denoting cartons with contents the integrity of which is within the acceptable range.

The digital output 52c of the signal comparing stage 52 transmits signals h to the input 56a of the aforementioned shift register 56 as well as to the input 62b of an AND gate 62. The input 62a of this gate receives clock pulses g from the generator 58, and the output 62c of the gate 62 transmits a signal j to the input 64a of the evaluating circuit 64 when the input 62b receives a signal h. The signal j induces the circuit 64 to disregard each signal a which is transmitted to the input 64a and is indicative of the weight of a carton 2 confining an array of packets 4 the combined weight of which is outside of the acceptable range. However, when the AND gate 62 fails to transmit a signal j the circuit 64 processes the signal a from the weighing device 32 and, if necessary, transmits a modified (updated) signal d which is indicative of the averaged acceptable weight of a given number n of last satisfactory cartons 2.

Otherwise stated, when the absolute value of the signal e being transmitted to the input 52a of the signal comparing stage 52 is less than that of the signal f being transmitted by the potentiometer 54 to the input 52b, the signal a generated by the weighing device 32 is indicative of a satisfactory container 2 and the output 52c then transmits a LOW signal h which is disregarded by the shift register 56 so that the ejector 60 remains inactive. However, the LOW signal h causes the AND gate 62 to transmit a signal which induces the circuit 64 to process the corresponding signal a i.e., to utilize the signal a for the transmission of a signal d having a characteristic influenced by the signal a. Thus, the circuit 64 processes each signal a which is indicative of a satisfactory carton 2 so that such signal a influences the characteristics of the signal d being thereafter transmitted by the output 64d.

For example, the evaluating or averaging circuit 64 can be set up to calculate the signal d (on the basis of n "satisfactory" signals a being transmitted to the input 64a) in accordance with the equation $$d=(a_{actual}+a_{n-1}+a_{n-2})/n$$

wherein $a_{actual}$ is the last "satisfactory" signal a.

The reference character 66 denotes a source of signals k which can be transmitted to the input 64c of the circuit 64 in response to closing of a switch 68. The signal k is an experimentally ascertained signal which is used by the circuit 64 in lieu of a calculated signal d when the apparatus 1 is started, i.e., before the output 64d of the circuit 64 can generate a signal d on the basis of n signals a. Such situation (that the switch 68 must be closed in order to connect the source 66 of signals k with the input 64c of the circuit 64) can arise, for example, upon starting of the conveying means 6, upon starting of delivery of a series of cartons 2 onto the conveying means, or when the delivery of a first type of cartons 2 is terminated and the apparatus must be set up for the weighing of a series of different containers.

An important advantage of the improved method and apparatus is that the simple expedient of comparing the weights of successive containers of a series of such containers with an experimentally determined weight (signal k) or with a continuously or sporadically updated weight (signal d) suffices to ascertain the integrity or lack of integrity of the contents of weighed containers. It is a rather simple expedient to select a weighing device which can determine the weight of each of a series of successive containers with a degree of accuracy amply sufficient to ascertain whether or not the integrity of the contents of such containers is within a desired range (e.g., to ascertain whether or not one or more packets 4 are missing from a carton 2 which normally confines ten packets).

An advantage of the illustrated apparatus 1 (wherein the weighing device 32 is integrated into the conveying means 6) is that the apparatus can be integrated into an automated production line (such as one embodying the aforementioned B 90, Pewo-Fold and Cp 90 machines) without necessitating any slowdown of the production line and/or of its constituents. At the same time, a machine which is employed to process (e.g., confine in transparent or translucent outer envelopes or to confine in boxes) the containers which have been conveyed through the weighing station) invariably receives only those containers the contents of which are acceptable, i.e., only those containers which are ready for wrapping or boxing or warehousing (namely for sale to customers).

As already mentioned above, the conveying means 6 can be driven continuously or in a stepwise fashion. This is possible because the pushers 12 cooperate with the respective abutments 14 to hold the cartons 2 against movement relative to the conveying means 6 irrespective of whether the later is driven continuously or in a stepwise manner. Weighing of cartons 2 being carried by intermittently driven conveying means contributes to accuracy of the measurements because carton at the weighing station above the platform 34 is not influenced by forces acting upon a carton which in motion during advancement through the weighing station. On the other hand, weighing of cartons which are in motion while at the weighing station renders its possible to weigh successive cartons at a higher frequency. However, the illustrated apparatus can weigh successive moving cartons 2 with a very high degree of accuracy because the parts 12, 14 of the conveying means 6 prevent uncontrolled movements of the carton relative to the moving parts of the conveying means while the position of the platform 34 of the weighing device 32 is fixed so that each successive carton dwells at the weighing station for the same interval of time even though the belts 8a, 8b are driven without interruption. Once the underside 30 of a carton 2 reaches the end of the upper side of the track portion 24 ahead of the weighing station and slides along the upper sides 35a, 35b of the sections 34a, 34b of the composite weighing platform 34, the circumstances for accurate weighing of each of a short or long series of successive cartons are the same so that the fact that the cartons are in motion during travel through the weighing station is of little, if any, consequence for the accuracy of the weighing operations. The finish of the upper sides 28 of portions of the track 24 upstream and downstream of the weighing station, and of the upper sides 35a, 35b of the platform sections 34a, 34b, can be readily selected with a view to ensure smooth transition of the underside 30 of a carton 2 from the track portion upstream of the weighing station onto the sections 34a, 34b and thereupon onto the track portion downstream of the weighing station.

The provision of the evaluating or averaging circuit 64 constitutes an optional but highly desirable and advantageous feature of the improved apparatus. Such circuit renders it possible to take into consideration gradual changes of the weight of satisfactory cartons 2 or other types of containers for contents the integrity of which requires monitoring and evaluation. For example, the circuit 64 can compensate for possible gradual changes of the weight of the material of each carton and/or for gradual changes of the weight of a packet 4 (namely of the container of the packet and/or of the fillers of cigarettes and/or of the tubular envelopes of cigarettes) In the absence of updating of the information represented by the signal d, the ejector 60 could receive a signal to segregate short or long series of cartons having satisfactory contents.

Since the circuit 64 is prevented from considering a signal a which is generated by a carton 2 having a weight outside of an acceptable range of weights, the signal d cannot be influenced by such signal a, i.e., the weight of a carton the contents of which are outside of an acceptable range cannot influence (distort) the signal d being updated and transmitted by the circuit 64.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of monitoring the contents of containers for smokers' products or the like and, therefore, such adaptations should and are intended to be comprehended within the meaning and range of equivalence of the appended claims.

What is claimed is:

1. A method of ascertaining the presence and absence of integrity of the contents of containers having a predetermined weight when the integrity of the contents is within a preselected acceptable range, comprising the steps of advancing a series of successive containers along a predetermined path;

individually weighing successive containers of said series in a predetermined portion of said predetermined path;

averaging the ascertained weights of a plurality of containers; and comparing the individually ascertained weights with the averaged ascertained weight.

2. The method of claim 1, wherein the contents of the containers include smokers' products.

3. The method of claim 1, wherein the containers are cartons and the contents are packets of rod-shaped smokers' products.

4. The method of claim 1, wherein the advancing of the series is intermittent and the predetermined path includes a weighing station, said weighing step including weighing successive containers of said series while at a standstill at said station.

5. The method of claim 1, further comprising the step of updating the averaged weights upon completed weighing of at least some of the successive containers in the predetermined portion of said path.

6. The method of claim 5, wherein the contents of containers are pluralities of commodities and a container has a predetermined weight when its contents encompasses X commodities, said updating step including altering, when necessary, the averaged weights upon completed weighing of each container wherein the contents encompasses between X−1 and X+1 commodities.

7. The method of claim 1, wherein the predetermined path includes a weighing station, said weighing step including weighing successive containers of the series while in motion at said station.

\* \* \* \* \*